United States Patent [19]
Lentini et al.

[11] Patent Number: 5,012,122
[45] Date of Patent: Apr. 30, 1991

[54] CIRCUIT TO INHIBIT VOLTAGE AND CURRENT RETURNS TO THE ELECTRIC POWER DISTRIBUTION LINE IN AN INVERTER-TYPE POWER PLANT

[75] Inventors: Salvatore Lentini; Giuseppe Patti, both of Palermo, Italy

[73] Assignee: Italtel Societa Italiana Telecommunicazioni s.p.a., Milan, Italy

[21] Appl. No.: 424,241

[22] PCT Filed: Apr. 4, 1988

[86] PCT No.: PCT/EP88/00327
§ 371 Date: Oct. 20, 1989
§ 102(e) Date: Oct. 20, 1989

[87] PCT Pub. No.: WO88/09075
PCT Pub. Date: Nov. 17, 1988

[30] Foreign Application Priority Data
May 14, 1987 [IT] Italy ................. 20511 A/87

[51] Int. Cl.$^5$ .................. H02J 9/04
[52] U.S. Cl. .................. 307/66; 307/46; 307/86; 361/84; 363/71

[58] Field of Search .............. 363/71; 307/46, 51, 307/64, 66, 86, 87; 361/62, 63, 84

[56] References Cited

U.S. PATENT DOCUMENTS

| | | | |
|---|---|---|---|
| 4,104,539 | 8/1978 | Hase | 307/66 |
| 4,471,233 | 9/1984 | Roberts | 307/66 |
| 4,763,013 | 8/1988 | Gvoth et al. | 307/66 |
| 4,763,014 | 8/1988 | Model | 307/66 |

FOREIGN PATENT DOCUMENTS 2271711 12/1975 France .
2160722 12/1985 United Kingdom .

Primary Examiner—William H. Beha, Jr.

[57] ABSTRACT

The present invention is applicable for inverter-type power plants where the electric distribution line is used as stand-by unit. The present invention is composed of a ballast impedance and an electric mesh including an energizing circuit of a first section suitable for insulating a power plant from the distribution line; contacts of a second section which are monitored by a supervisory control circuit of the power plant; and an electric probe for making available a voltage or a current measurement when current flows through the distribution line.

8 Claims, 3 Drawing Sheets

CIRCUIT TO INHIBIT VOLTAGE AND CURRENT RETURNS TO THE ELECTRIC POWER DISTRIBUTION LINE IN AN INVERTER-TYPE POWER PLANT

BACKGROUND OF THE PRESENT INVENTION

The present invention is applicable for inverter-type power plants where the electric distribution line is used as stand-by unit. The present invention is composed of a ballast impedance and an electric mesh comprising an energizing circuit of a first section suitable for insulating a power plant from the distribution line; the contacts of a second section which are monitored by a supervisory control circuit of the power plant; and an electric probe making available a voltage or a current measurement when current flows through the distribution line.

The present invention is directed to a circuit for inhibiting voltage and current returns to the distribution line in an inverter-type power plant which uses the distribution line as stand-by unit. In this system, the load is switched during the presence of faults in one or more inverters or during the presence of an overload condition caused, for example, by a fault in the utilizing units.

As shown, the inverters receive a direct voltage at their input and output an alternating voltage which feeds a load. The power plants of this type comprise one or more inverters, connected in parallel, as well as, one or more stand-by inverters or electric distribution lines as stand-by units. The power plants are then used to feed systems which require an high degree of reliability. It is therefore necessary to provide working and stand-by devices, as well as, a supervisory control circuit. The present invention is to be utilized when the electric distribution line is used as stand-by unit.

In particular, when the supervisory control circuit detects the presence of faults in the working devices, this control circuit causes a disengagement of a first set of static switches which, by assuming a normal condition of "open", cause a sectioning of the connection between the load and the working devices. The static switches may be centralized (located on the multiple unit which connects in parallel the inverters to the utilizing units) or remotely located (i.e. in cascade to each inverter). At the same time the supervisory control circuit releases a second set of static switches which, by assuming a normal condition of "closed", connect the load to the distribution line which is the stand-by unit, as specified above. During normal operations (the load being fed by inverters) and due to a fault in the system, it is possible that the second set of static switches unduly assume the configuration of "closed", so that the distribution line is connected to the inverters. The fault causes both accident prevention and handling problems. The problems relating to the accident prevention arise when the faults mentioned above occur, and a determined voltage or current returns to the electric distribution line. When the faults occur during a maintenance operation (subsequent, for example, to a sectioning operation of a network section which is therefore insulated from the power generators located upstream from the network section interested), problems related to the accident prevention may arise, as the personnel works with the understanding that the mains are not connected to any power source. These handling problems arise in conditions similar to the above (load feeded by inverters and with a fault in the second set of static switches), and they are caused by a power transfer to the distribution line in the absence of any regulations suitable to control the transfer.

The units which arrange the electric energy distribution do not usually allow the direct parallel connection between the network and a set of inverters, except when specific regulations are provided and adequate devices for the execution of the operation are arranged.

In the known power plants, due to faults in the static switches or in the supervisory control circuit, the voltage and current returning to the electric distribution line is inhibited by a current return device connected in series to the electric distribution line. As known, these devices are adequate to carry out a sectioning of the line when they detect an energy transfer in the direction opposite to the normal working direction. A current return device, namely "a reverse power flow blocking and sensing device" is shown in the Figures of U.S. Pat. No. 4,104,539 and disclosed in column 6, lines 60 to 66 of this U.S. Patent. These devices are too expensive and have too large of an operating time. They are, therefore, suitable only to solve the handling problems cited above, but are not adequate to solve the problems associated with accident prevention, as personnel usually intervene when the sectioning has been already carried out. No current, therefore, flows, and the current return device may not operate. In fact, since the operating time of these devices is too long, the sectioning time of the connection may be not effected (if the current intensity of the human body is inferior to the operating current) or may be effected when the accident has already occurred.

The known devices are not capable of solving the problems of an accident prevention nature caused by voltage returns to the electric distribution line.

SUMMARY OF THE INVENTION

An object of the present invention is to solve the problems connected both with accident prevention and handling, as stated above.

Another object of the present invention is to use a circuit for inhibiting voltage and current returns to the electric distribution line, particularly suitable for the application in inverter-type power plants.

In accordance with the above objects, the present invention is utilized in a power plant having one or more inverters connected in parallel to feed a load through a first set of static switches; a first section for connecting the load to the electric distribution line through a second set of static switches; a supervisory control circuit for connecting the first set of static switches or the second set of static switches, depending on the inverters condition, to the load to be fed or to the electric distribution line, respectively.

To solve the above stated problem, the present invention utilizes a circuit comprising an electric probe for detecting when a current returns to the electric distribution line; a ballast impedance for causing a current to flow through the electric probe when the second set of static switches assumes the condition of "closed" due to a fault; and an energizing circuit for controlling the operations of the first section according to a voltage or current signal from a output of the probe wherein the signal is received through the contacts of a second section controlled by the supervisory control circuit.

When the load is fed by the set of inverters during the presence of a fault in the second set of static switches, and the distribution line joined to the power plant is sectioned and therefore without any load, the same current which flows through the ballast impedance (preferably capacitive or inductive type) flows through the electric branch downstream from the first section. The current flow is detected by the electric probe, at the ends of which a voltage or a current is available, thereby causing current to flow through the energizing circuit of the first section. This disengages the power plant from the distribution line, thereby avoiding the accident prevention and handling problems mentioned above.

BRIEF DESCRIPTION OF THE DRAWINGS

The above objects, features and advantages of the present invention will become more apparent from the following description when taken in conjunction with the accompanying drawings in which.

DETAILED DESCRIPTION OF THE PRESENT INVENTION

Figure 1:
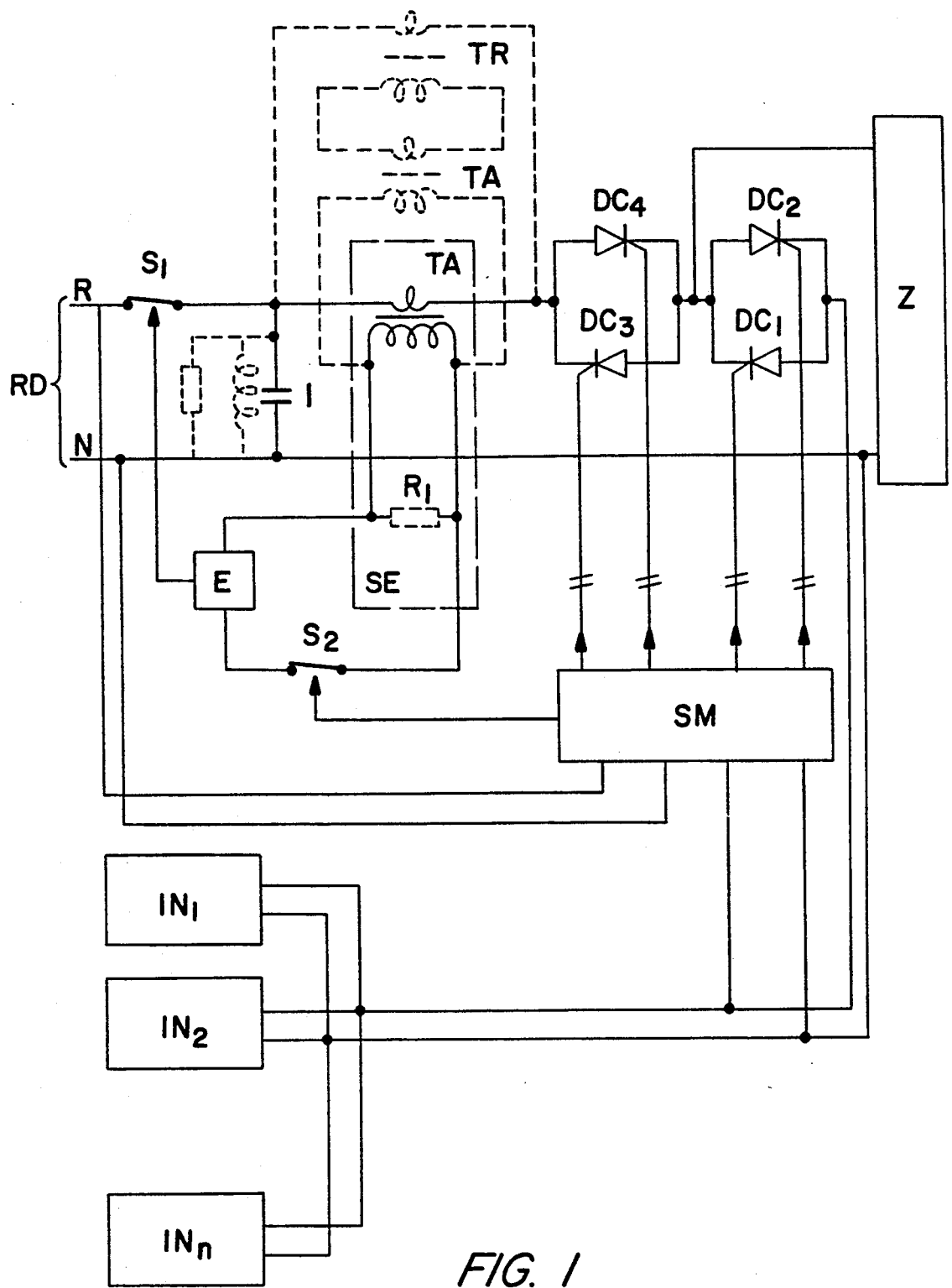
FIG. 1 shows a single-phase power plant, including a first embodiment of the present invention.

FIG. 1 is a power plant having a plurality of inverters $IN_1$, $In_2$, ... $IN_n$, connected in parallel; a first set of static switches, composed of two monitored diodes $DC_1$ and $DC_2$, which are jointly released by a supervisory control circuit SM and are connected so that alternating current may flow through them; a second set of static switches composed of two monitored diodes $DC_3$ and $DC_4$, which are jointly released by the supervisory control circuits SM so that alternating current may flow; and a first section $S_1$ for connecting an electric distribution line RD, at wires R and N, to the second set of static switches ($DC_3$ and $DC_4$). The supervisory control circuit SM verifies the predetermined parameters (for example, amplitude, phase, etc.) of the voltage available at the output of both the inverters IN and the line RD; provides the supply of the load through inverters IN, i.e., through the distribution line RD; and monitors the closing and opening of a second section $S_2$.

FIG. 1 further illustrates an electric probe SE at the output of which a voltage or a current is available when a current return to the electric distribution line RD is detected; a ballast impedance for causing a current to follow through the electric probe SE when the second set of static switches ($DC_3$ and $DC_4$) assumes the condition of "closed" due to a fault; and an energizing circuit E for controlling the first section $S_1$ according to the voltage or current signal at the output of the probe wherein the signal is received through the contacts of the second section $S_2$ controlled by the supervisory control circuit SM.

When the load is fed by the inverters IN, the supervisory control circuit SM shall release the diodes $DC_1$ and $DC_2$; disengage the diodes $DC_3$ and $DC_4$; and cause the closing of the contacts of the second section $S_2$. When there are no faults in the diodes $DC_3$ and $DC_4$ the switches are in the "open" condition, thereby inhibiting voltage or current from returning to the electric distribution line RD. Under these conditions no current flows through the probe SE and the contacts of the first section $S_1$ are therefore closed. When there is a fault in the diodes $DC_3$ and $DC_4$ (or their control circuits), these switches are in the "closed" condition, thereby causing voltage and current to return to the distribution line RD, as well as, problems connected to the accident prevention. In this case, an alternative voltage is available at the ends of the electric probe SE, which causes the flow of current through the energizing circuit E, thereby controlling the contacts of the first section $S_1$ to open and inhibit any voltage or current from returning.

According to a preferred embodiment of the present invention, the ballast impedance I is a reactive type (preferably capacitive or inductive) so not to dissipate active power.

It is further possible to use a resistive impedance or a combination of the above impedances.

It is useful to point out, that when an isolation transformer or other impedance, concentrated or distributed, is provided between the distribution line and the load, an additional concentration ballast impedance I can be eliminated if the current is absorbed by the other impedance, or the magnetizing current of the isolation transformer is sufficient to cause the energizing of the first section $S_1$ to open the contacts. In fact, in the above circuits, the ballast impedance I is constituted by the other impedance or by the distributed impedance of the isolation transformer.

This circuit according to the present invention causes the opening of the contacts of the first section $S_1$ even when the network section joined to the power plant has been sectioned in order to allow the maintenance operations. In fact, when a fault in the diodes $DC_3$ and $DC_4$ is found, a reactive current is registered, caused by the ballast impedance I, which, if a reactive type, does not involve active energy dissipation and causes the opening of the first section $S_1$ independently from the condition of the knife switches arranged upstream from the network section under maintenance.

It is further possible to use an energizing circuit for the first section which monitors a current instead of a voltage as illustrated in FIG. 1. In this case, the resistance $R_1$ provided in the electric probe SE is not necessary.

It is necessary to point out that the electric mesh may assume configurations which differs from what described above (for example, the second section can be arranged in parallel to the energizing circuit of the first section), that are however based on the same principles of the second section $S_2$ influencing the activation of the first section $S_1$ through the mesh opening, i.e., by causing a short circuit of some of the mesh elements.

It is further noted that, as illustrated in FIG. 1 with a dotted line, the electric probe SE may indirectly detect a current flow through the electric distribution line RD. It is possible in particular to connect the distribution line RD to the primary windings of a step-down transformer TA wherein the secondary windings are connected to the probe SE.

Figure 2:
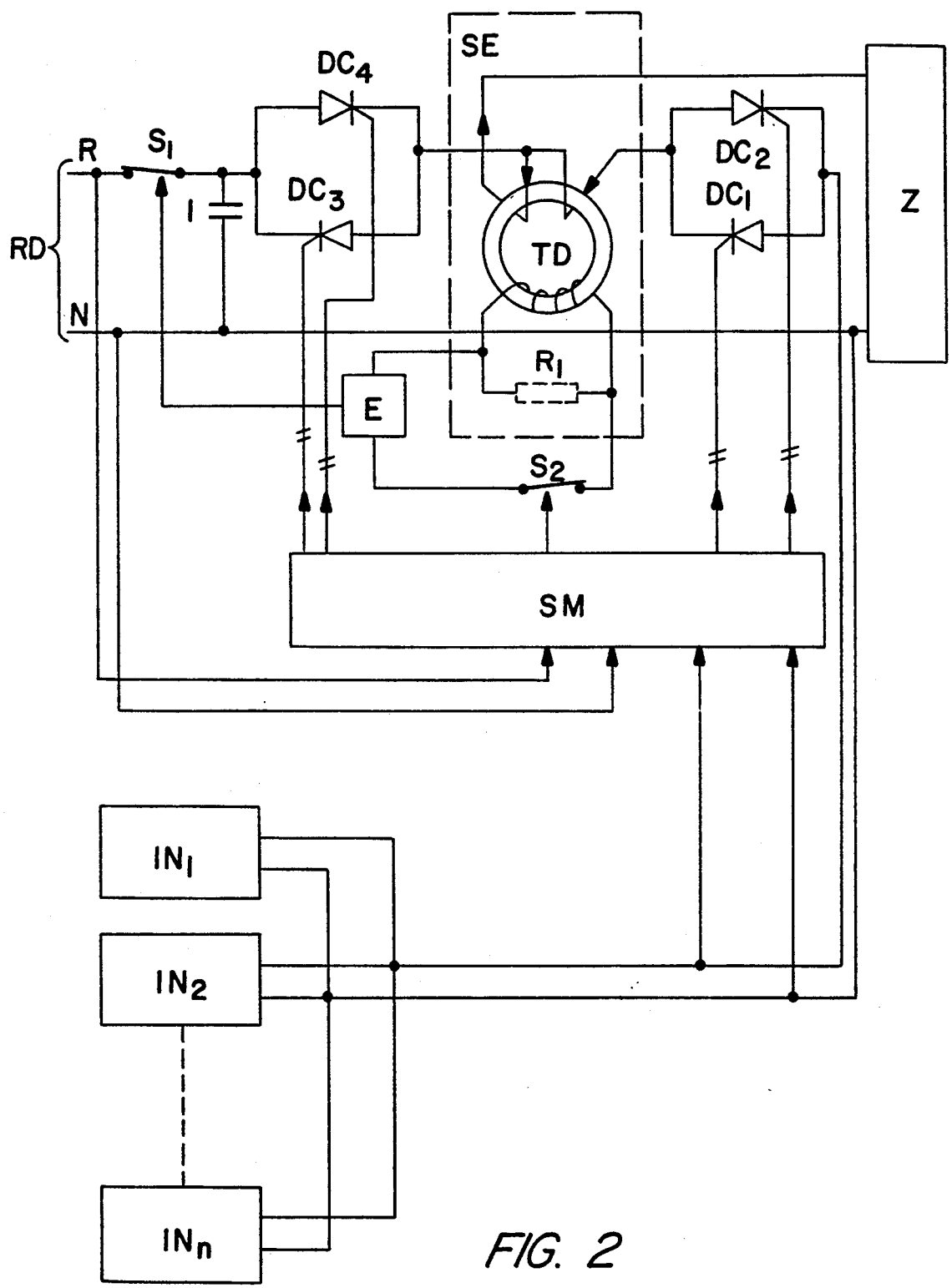
FIG. 2 shows the power plant of FIG. 1, including a second embodiment of the present invention.

FIG. 2 shows a second embodiment of the present invention, where the electric probe SE replaces the transformer TA mentioned above with a differential transformer TD, having a first winding through which the current produced by the inverters flows; a second winding through which the current for the load flows; and a third winding through which the current flows when (during a fault in the diodes $DC_3$ and $DC_4$) the value of the current emitted by the inverters differs from the value of the current which comes to the load.

During normal operations (a load being fed by the inverters), in the absence of a fault in the diodes $DC_3$ and $DC_4$, no current flows as the magnetic fields originated by the currents which flow through the first and the second windings are equal and opposite and therefore they cancel each other.

When a fault occurs in the diodes $DC_3$ and $DC_4$, part of the current produced by the inverters comes to the electric distribution line RD, as well as, to the ballast impedance I and the value of the current which flows through the first winding therefore differs from the value of the current which flows through the second winding. The magnetic fields originated by the currents do not cancel each other, and therefore, a current is induced in the third winding. This causes the activation of the first section $S_1$ according to procedures similar to those illustrated for the first embodiment of the present invention.

Figure 3:
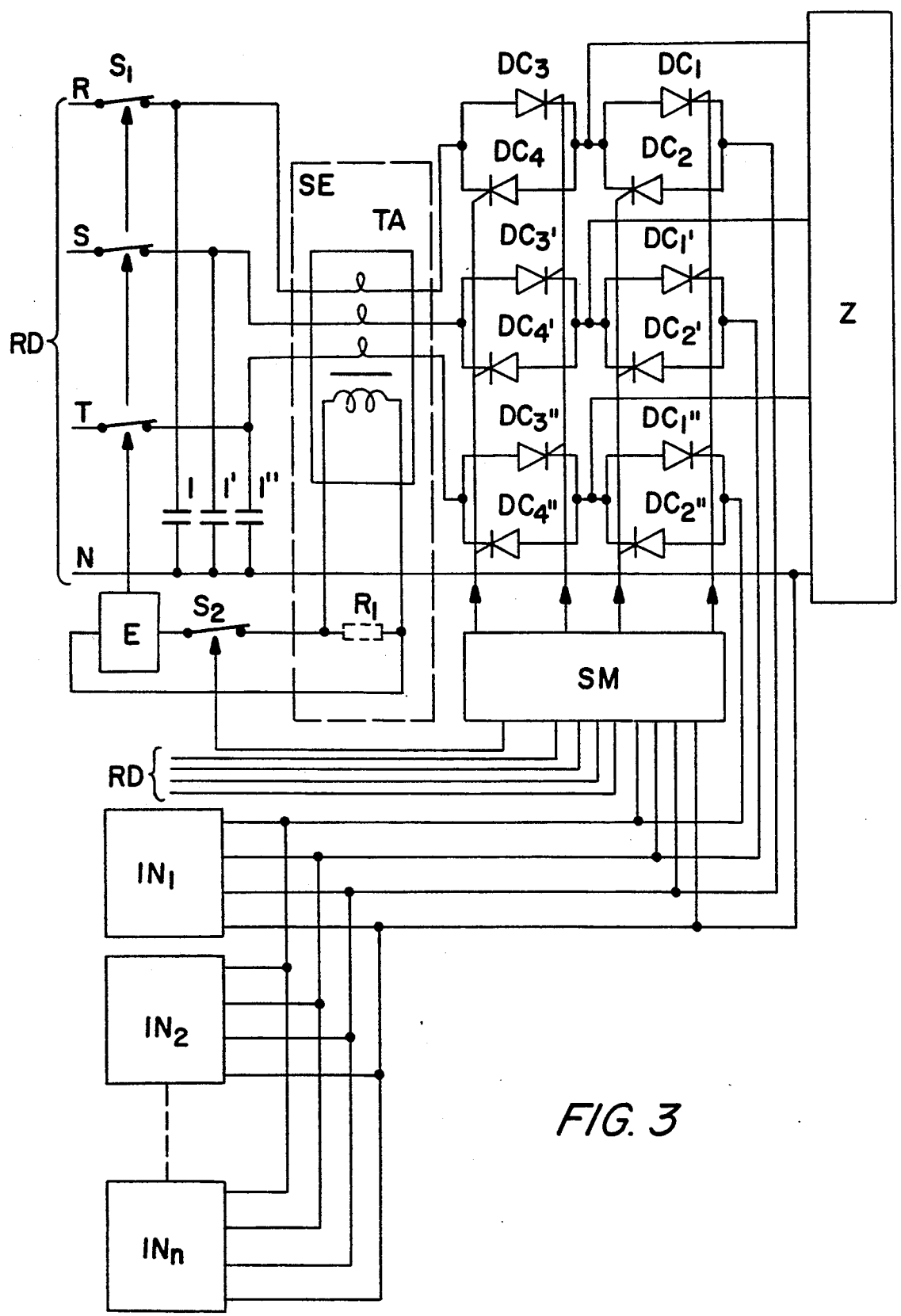
FIG. 3 shows a three phase power plant including the first embodiment of the present invention.

FIG. 3 shows a three-phase type power plant utilizing the first embodiment of the present invention. In addition to the neutral wire N and to the wire R, present in the single-phase power plants, there are the wires S and T. The first section $S_1$, the first set of static switches $DC_1$ and $DC_2$, the second set of static switches $DC_3$ and $DC_4$, the primary winding of transformer TS and the ballast impedance I are constituted by three functional units instead of one unit as illustrated in FIG. 1.

The second embodiment of the present invention is not illustrated in the three-phase power plant because the relative diagram may be easily realized if the principles of FIG. 2 are applied to the diagram of FIG. 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A circuit for inhibiting voltage and current from returning to the electric distribution line in inverter-type power plants including one or more inverters connected in parallel and feeding a load through a first set of static switches, a first section to connect the load to the electric distribution line through a second set of static switches; a supervisory control circuit for controlling the first set of static switches and the second set of static switches, depending on the condition of the inverters, to connect to the load to be fed and to the electric distribution line, respectively, the circuit comprising:

an electric probe for outputting a voltage or a current when a current return to the electric distribution line is detected;

a ballast impedance for causing a current to flow through said electric probe when the second set of static switches is in a closed condition due to a fault; and an energizing circuit for activating the first section according to an output from said electric probe, said output being controlled by contacts of a second section operated by the supervisory control circuit.

2. The circuit as claimed in claim 1, wherein said electric probe controls said energizing circuit through current and includes a transformer having a primary winding connected in series to the electric distribution line.

3. The circuit as claimed in claim 1, wherein said electric probe controls said energizing circuit through voltage and includes a transformer having a secondary winding connected to the ends of a resistance.

4. The circuit as claimed in claims 2 or 3, wherein said transformer is connected to the electric distribution line through an additional transformer.

5. The circuit as claimed in claim 1, wherein said electric probe includes a transformer having a first winding fed by a current produced by the inverters, a second winding fed by current which feeds the load, and a third winding fed by a current having a value equal to a difference between said currents which flow through said first and second windings.

6. The circuit as claimed in claim 5, wherein a resistance is connected to ends of said third winding.

7. The circuit as claimed in claim 1, wherein said ballast impedance is a reactive type.

8. The circuit as claimed in claim 1, wherein said ballast impedance is composed of an impedance of a secondary winding in an additional transformer.

* * * * *